(12) United States Patent
Vedantham et al.

(10) Patent No.: US 8,958,464 B2
(45) Date of Patent: Feb. 17, 2015

(54) PHY PAYLOAD OVER MULTIPLE TONE MASKS USING SINGLE TONE MASK PHY HEADER INFORMATION

(75) Inventors: Ramanuja Vedantham, Allen, TX (US); Anand G. Dabak, Plano, TX (US); Tarkesh Pande, Dallas, TX (US); Il Han Kim, Dallas, TX (US); Kumaran Vijayasankar, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 313 days.

(21) Appl. No.: 13/493,268

(22) Filed: Jun. 11, 2012

(65) Prior Publication Data

US 2012/0314744 A1    Dec. 13, 2012

Related U.S. Application Data

(60) Provisional application No. 61/495,003, filed on Jun. 9, 2011.

(51) Int. Cl.
*H04B 1/38* (2006.01)
*H04B 3/54* (2006.01)
*H04L 5/00* (2006.01)
*H04L 27/26* (2006.01)

(52) U.S. Cl.
CPC .............. *H04B 3/542* (2013.01); *H04L 5/0007* (2013.01); *H04L 5/0037* (2013.01); *H04L 5/0094* (2013.01); *H04L 27/2613* (2013.01); *H04L 27/2666* (2013.01); *H04B 2203/5408* (2013.01); *H04B 2203/5445* (2013.01)

USPC ........... 375/222; 375/219; 375/257; 375/260; 375/295; 375/316; 375/340; 370/208; 370/445; 455/73; 455/91

(58) Field of Classification Search
CPC ... H04L 5/0007; H04L 5/0037; H04L 5/0094; H04L 5/2613; H04L 5/2666; H04B 3/542
USPC ......... 375/219, 222, 257, 260, 295, 316, 340; 370/208, 445; 455/73, 91
See application file for complete search history.

(56) References Cited

U.S. PATENT DOCUMENTS 8,320,233 B2* 11/2012 Razazian et al. .............. 370/208
2008/0153430 A1   6/2008 Yonge, III

* cited by examiner

*Primary Examiner* — Leon Flores
(74) *Attorney, Agent, or Firm* — Steven A. Shaw; Frederick J. Telecky, Jr.

(57) ABSTRACT

A method of powerline communications (PLC) includes compiling a data frame for physical layer (PHY) by a first communications device at a first communications node on a powerline of a PLC network. The data frame includes a single tone PHY header portion and a data payload portion in a set of tones including at least one tone having a frequency different from a frequency of the single tone. The PHY header portion includes tone mask identification information identifying the set of tones. The first communications device transmits the data frame over the powerline to a second communications device at a second communications node on the powerline. The second communications device receives the data frame, and decodes the data payload using the tone mask identification information in the PHY header portion.

22 Claims, 3 Drawing Sheets

PHY PAYLOAD OVER MULTIPLE TONE MASKS USING SINGLE TONE MASK PHY HEADER INFORMATION

CROSS REFERENCE TO RELATED APPLICATIONS

This application and the subject matter disclosed herein claims the benefit of Provisional Application Ser. No. 61/495,003 entitled "PHY PAYLOAD TRANSMISSION OVER MULTIPLE TONE MASKS USING SINGLE TONE MASK PHY HEADER INFORMATION" filed Jun. 9, 2011, which is herein incorporated by reference in its entirety.

FIELD

Disclosed embodiments relate generally to the field of powerline communications, and more specifically to communication of tone mask information between devices in powerline communications networks.

BACKGROUND

Power line communications (PLC) include systems for communicating data over the same medium (i.e., a wire or conductor) that is also used to transmit electric power to residences, buildings, and other premises. Once deployed, PLC systems may enable a wide array of applications, including, for example, automatic meter reading and load control (i.e., utility-type applications), automotive uses (e.g., charging electric cars), home automation (e.g., controlling appliances, lights, etc.), and/or computer networking (e.g., Internet access), to name only a few.

Current and next generation narrow band PLC are orthogonal frequency division multiplexing (OFDM)-based (as opposed to frequency shift keying (FSK)-based) in order to get higher network throughput. OFDM uses multiple orthogonal subcarriers to transmit data over frequency selective channels. A conventional OFDM structure for a data frame includes a preamble, followed by a physical layer (PHY) header, followed by a data payload. Examples of OFDM-based PLC standards include IEEE P1901.2 and PoweRline Intelligent Metering Evolution (PRIME).

In PLC networks, the system has the ability to communicate in both low voltage (LV) powerlines as well as high voltage power lines. When operating in a high-voltage powerline the system is able to communicate with low-voltage powerlines. This means that the receiver on the LV side must be able to detect the transmitted signal after it has been severely attenuated as a result of going through a medium voltage (MV)/LV transformer. The coupling interface between the PLC device and the MV medium may be referred to as a MV/LV crossing.

In PLC networks that have MV/LV crossings, data transmission over the full FCC allowed frequency band may not be feasible due to network conditions (e.g., noise) so that smaller frequency band portions referred to as tone masks (or sub-bands) may be needed for each particular MV/LV communication link. A tone map in contrast to a tone mask refers to an allocation of power within a tone mask. The tone mask can thus be considered to be a collection of tone maps.

The receiving PLC device may be "listening" only on one tone mask at a given time. Since the set of tone masks that provide effective communications for a particular link may vary link-to-link, the receiver may not be tuned to the proper set of tone masks to decode the received frame. When nodes are unable to decode the data payload sent over the tone masks indicated in the received frame, such as indicated in the PHY header referred to as the frame control header (FCH) in the case of the IEEE P1901.2 standard, the node will set their virtual carrier sensing (VCS) to the EIFS value to account for the largest data payload size transmission allowed in the network.

SUMMARY

Disclosed embodiments are directed to powerline communications (PLC) and, more specifically, to methods of PLC that enables a data frame for the physical layer (PHY) to have a PHY header portion to be sent in a single tone mask (TM) with information about the set of TMs in which the data payload portion of the frame will be transmitted. Such embodiments enable more efficient ways of using the set of available tones.

One embodiment comprises a method of PLC communications including compiling a data frame for a PHY by a first communications device at a first communications node on a powerline of a PLC network. The data frame includes a single tone PHY header portion and a data payload portion in a set of tones including at least one tone having a frequency different from a frequency of the single tone. The PHY header portion includes TM identification information identifying the set of tones used in the data payload portion. The first communications device transmits the data frame over the powerline to a second communications device at a second communications node on the powerline. The second communications device receives the data frame, and decodes the data payload using the TM identification information in the PHY header portion.

BRIEF DESCRIPTION OF THE DRAWINGS

Reference will now be made to the accompanying drawings, which are not necessarily drawn to scale, wherein.

DETAILED DESCRIPTION

Disclosed embodiments now will be described more fully hereinafter with reference to the accompanying drawings. Such embodiments may, however, be embodied in many different forms and should not be construed as limited to the embodiments set forth herein. Rather, these embodiments are provided so that this disclosure will be thorough and complete, and will fully convey the scope of this disclosure to those having ordinary skill in the art. One having ordinary skill in the art may be able to use the various disclosed embodiments and there equivalents. As used herein, the term "couple" or "couples" is intended to mean either an indirect or direct electrical connection, unless qualified as in "communicably coupled" which includes wireless connections. Thus, if a first device couples to a second device, that connection may be through a direct electrical connection, or through an indirect electrical connection via other devices and connections.

Figure 1:
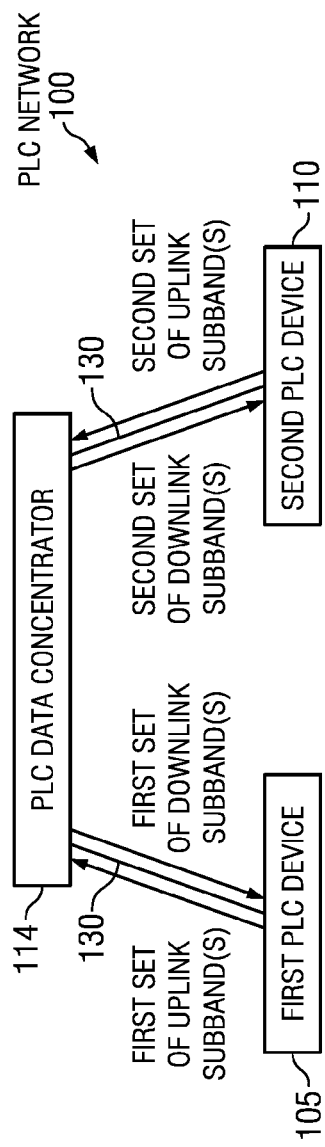
FIG. 1 is a block diagram of a simplified PLC network comprising different entities participating in PLC communications using a powerline, that can benefit from disclosed embodiments.

FIG. 1 is a block diagram of a simplified PLC network 100 comprising different entities participating in PLC communications using a powerline 130, that can benefit from disclosed embodiments. PLC network 100 includes a PLC data concentrator (or base node) 114 that may have a MV modem coupled to a MV powerline, and may therefore communicate with the first PLC device 105 at one node in the network and a second PLC device 110 at another node in the PLC network 100.

Both PLC devices 105 and 110 may include LV modems coupled to a shared powerline 130, or in another embodiment to different LV power lines (e.g., separated by one or more transformers). First PLC device 105 may receive packets from PLC data concentrator 114 using a first set of downlink subbands. In some cases, communication conditions (e.g., noise, interference, etc.) may be such that, from the perspective of PLC device 105, one or more of the available downlink subbands may yield a better signal-to-noise ratio than other downlink subbands. First PLC device 105 may also transmit packets to PLC data concentrator 114 using a first set of uplink subbands. Here, from the perspective of PLC data concentrator 114, one or more of the available uplink subbands may yield better a better signal-to-noise ratio. Also, because PLC data concentrator 114 may receive transmissions from a plurality of PLC devices, different sets of uplink subbands may be allocated to these different devices to reduce contention and potential collisions that may potentially negatively impact desired data rates, etc.

Second PLC device 110 may transmit packets to PLC data concentrator 114 using a second set of uplink subbands, and it may receive packets from PLC data concentrator 114 using a second set of downlink subbands. In some cases, the first set of uplink subbands may be at least partially non-overlapping and/or entirely distinct from the second set of uplink subbands. Similarly, the first set of downlink subbands may be at least partially non-overlapping and/or entirely distinct from the second set of downlink subbands. Moreover, in some implementations, PLC data concentrator 114 and/or PLC devices 105, 110 may be configured to process uplink and/or downlink signals from only one subband at a time ("narrowband"). In other implementations, PLC data concentrator 114 and/or PLC devices 105, 110 may be configured to process uplink and/or downlink signals from two or more subbands at a time ("wideband").

When operating in wideband mode, a given PLC device may be capable of transmitting and/or receiving packets spread across two or more uplink or downlink subbands using a suitable signal spreading algorithm. It should be noted that, although only three PLC devices 105, 110 and 114 (data concentrator) are shown in PLC network 100 in FIG. 1, a typical implementation may include any number of PLC devices (e.g., dozens of devices) coupled to a same PLC data concentrator 114. Also, PLC data concentrator 114 may allocate different uplink subbands to different devices, for example, based on each individual node's uplink quality.

Operation of PLC network 100 is now considered based on the IEEE P1901.2 standard. In this standard, the PHY header portion of the data frame for the PHY is referred to as a FCH portion. The first 24 bits [0:23] in the 32 bit TM field of the FCH portion is used in network communications to communicate the TM information to the receiver in both the UL and DL for the entire band. The TM [24:31] field is currently reserved.

Assume all PLC devices 105, 110 and 114 are configured for carrier sensing in a first TM (TM 1). The first PLC device 105 sends a data frame for PHY having a FCH portion in TM 1 with its TM field [0:23] indicating that the data payload will be sent in both TM 1 and TM 2, or TM 2 alone. The data concentrator 114 may successfully decode both the FCH and the data payload. The second PLC device 110 can decode the FCH as it is at TM 1, but cannot decode the data payload at TM 2 because TM 2 is not good for both the first and second PLC devices 105, 110. Since the second PLC device 110 cannot decode the data payload at TM 2, the second PLC device 110 will consider this scenario a collision and will set its Virtual Carrier Sensing (VCS) clock to the Extended Inter-Frame Space (EIFS) value, where the EIFS duration is typically large (e.g., 252 symbols+an acknowledgement (ACK) duration+response interframe spacing (RIFS), which being large can degrade network performance.

To facilitate inter-device communications among the devices in PLC networks such as in the PLC network 100 shown in FIG. 1, including avoiding the above-described collision determination, each PLC device may implement a data frame for the PHY including a disclosed PHY header portion which includes information about the set of tone masks in which the data payload in the data frame will be transmitted. The PHY header portion is sent to the receiver in a single TM which provides information about the set (2 or more) of TMs in which the data payload of the frame will be transmitted, thus enabling efficient ways of using the set of available tones.

Disclosed embodiments can be implemented for the IEEE P1901.2 standard by enabling the data tone mask (DTM) mode, generally by setting the DTM field to 1 and using the TM field. For other standards, one can define additional fields for the TM, which is another frame design option disclosed herein. As noted above, each TM mask refers to a discrete frequency band (or subband). When operating in the DTM mode, the TM bits corresponding to this TM are relevant for allocating power within that particular tone mask. If there are multiple TMs used for the data payload, the relevant bits in the TM for each of the tone masks utilized are used.

Figure 2A:
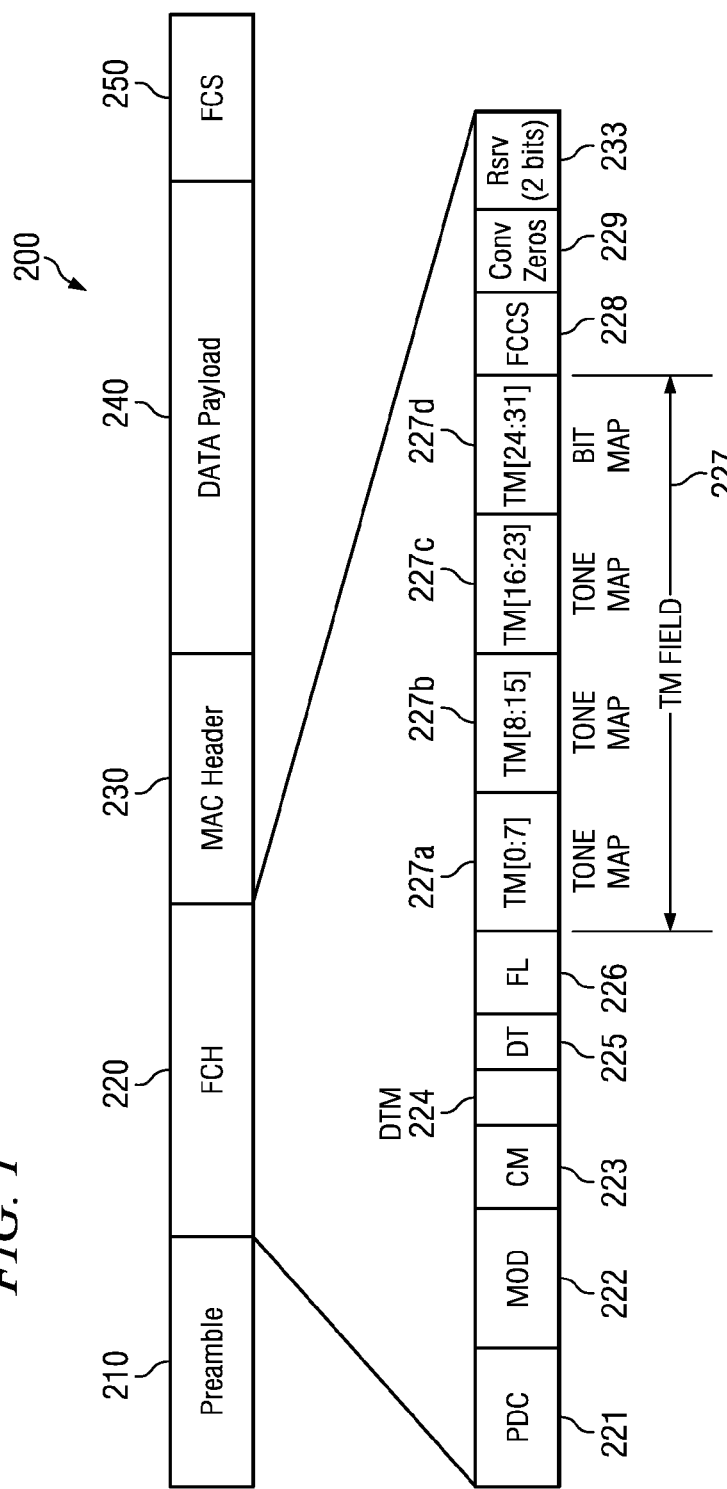
FIG. 2A is a diagram of an example data frame for a PHY including a PHY header portion that utilizes a single TM which provides information about the set of TMs in which the data payload will be transmitted, suitable for PLC communications, according to an example embodiment.

FIG. 2A is a diagram of an example PHY data frame 200 based on the IEEE 1901.2 standard including a new PHY header portion shown as FCH portion 220 that utilizes a single TM which includes a field shown as bit map 227d that provides information about the set of TMs in which the data payload 240 of the PHY data frame 200 which will be transmitted, suitable for PLC communications, according to an example embodiment. PHY data frame 200 is shown including a preamble portion 210, a FCH portion 220, a MAC header portion 230, a data payload portion 240, and a FCS portion 250.

The fields of FCH portion 220 are shown to reveal its structure. FCH portion 220 includes Phase Detection Counter (PDC) 221, Modulation type (MOD) 222; Coherent mode (CM) bits 223, DTM 224, delimiter type (DT) 225, frame length (FL; the PHY frame length in PHY symbols) 226, tone map (TM) 227 comprising TM [0:7] 227*a*, TM [8:15] 227*b*, TM [16:23] 227*c*, and TM [24:31] 227*d*, Frame Control Check Sequence (FCCS) 228, conv zeros (e.g., 6 zeros for convolutional encoder) 229, and Rsrv bits 233.

In FCH portion 220, TM bits 24:31 227*d* which are currently reserved in the IEEE P1901.2 standard, are used to represent the set of TMs used for the data payload portion 240 as a bit map. A bitmap in this embodiment refers to a sequence of bits, where each bit represents whether each of the available TMs is used, or not used, for the data payload portion 240 in PHY data frame 200.

Figure 2B:
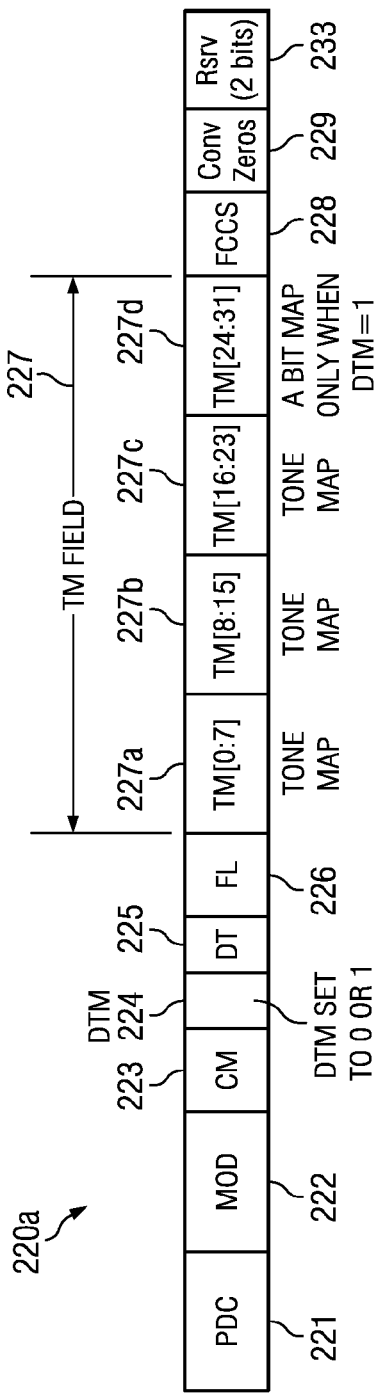
FIG. 2B is a diagram of an example PHY header portion that utilizes a single TM mask which provides information about the set of TMs in which the data payload in the data frame will be transmitted, according to an example embodiment.

FIG. 2B is a diagram of an example FCH portion 220*a*, according to an example embodiment. In FCH 220*a*, the TM [1:23] represents the TM. The DTM field 224 is set to 0 to indicate TMs, or set to 1 to indicate the DTM mode. In this embodiment TM bits 24:31 are used for a TM bitmap (as described above for FCH 220) only when the DTM 224 is set to 1; otherwise they are not used/reserved. This embodiment can be used with the embodiment described relative to FIG. 2A above, or can be practiced separately.

Figure 2C:
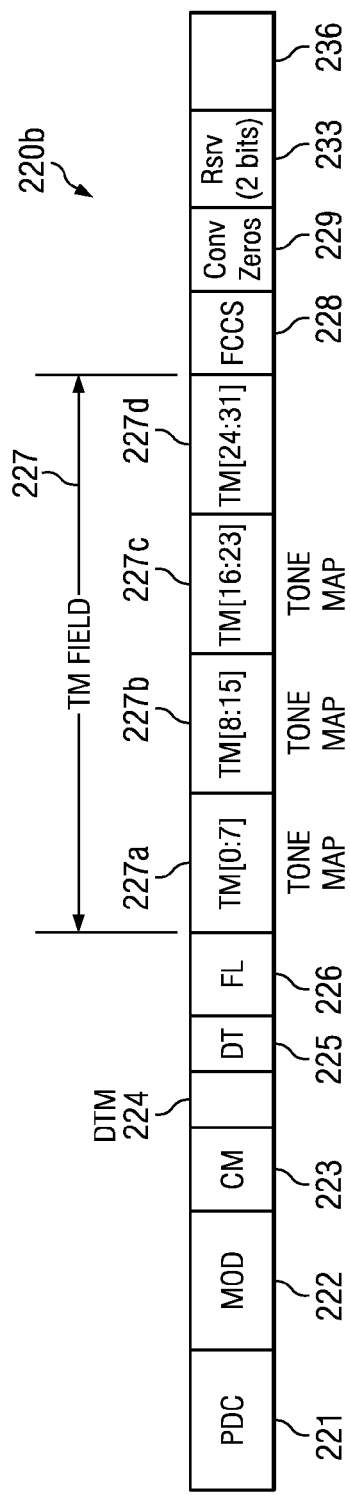
FIG. 2C is a diagram of another example PHY header portion that utilizes a single TM mask which provides information about the set of TMs which the data payload in the data frame will be transmitted, according to an example embodiment.

FIG. 2C is a diagram of an example FCH portion 220*b*, according to an example embodiment. In FCH 220*b*, an additional field shown as 236 is added to the FCH portion 220*b*, shown by example at the end of the FCH portion 220*b*. This embodiment can expand the FCH structure to include an additional TM field which can utilize a bit map representation to represent the TMs used by the data payload portion 240 of the frame, or can represent the TMs used by the data payload portion 240 of the frame in a format other than a bitmap. For example, the format of the identifier in field 236 can comprise <TM#1>, <extension#1>, <TM#2>, <extension#2>, etc. . . . TM 24:31 may be left as reserved as in the IEEE P1901.2 standard. In this embodiment, the added field 236 can end as soon as an extension bit is set to 0.

Advantages of disclosed embodiments include since the PHY header portion carries the TM information of the data payload portion of the frame, the data payload portion may be sent in a different TM or TMs when compared to the TM for the PHY header portion. This enables nodes in the PLC network to perform carrier sensing on one TM to send data over multiple TMs that may or may not include the TM in which carrier sensing is performed by the node. Disclosed embodiments also solve the Media Access Control (MAC) Carrier Sense Multiple Access (CSMA) problem that may result due to this technique since as described above, if the receiver cannot decode the frame, it will wait for a EIFS duration.

Figure 3:
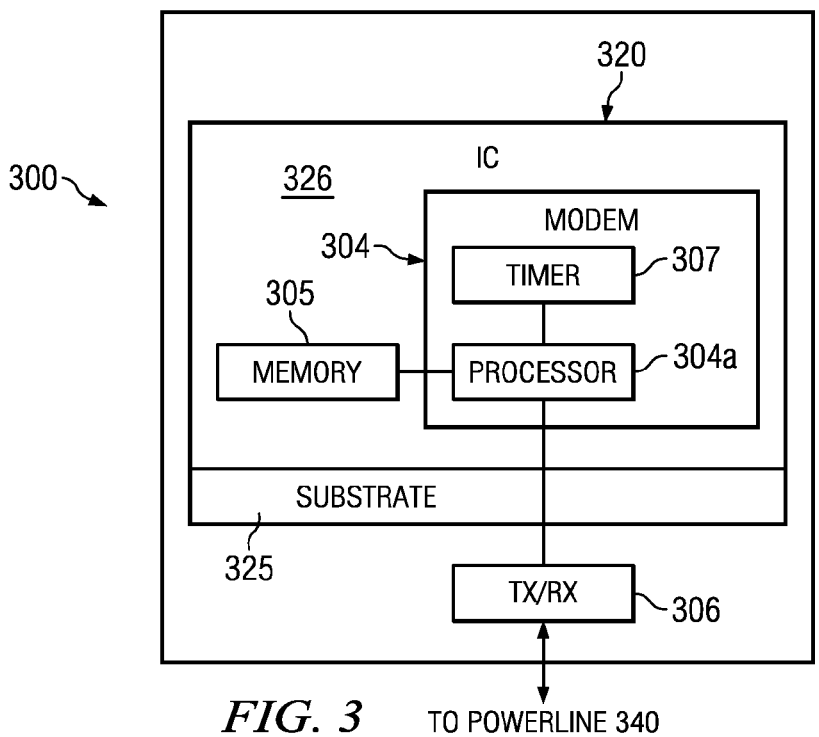
FIG. 3 is a block diagram schematic of a communication device having a disclosed modem that implements disclosed data frames for PHY including a PHY header portion that utilizes a single TM which provides information about the set of TMs in which the data payload of the data frame will be transmitted operation on a PLC communication channel, according to an example embodiment.

FIG. 3 is a block diagram schematic of a communication device 300 having a disclosed modem 304 that implements operation at a node on a PLC communication channel of a PLC network, including use of a data frame for PHY including a disclosed PHY header portion that utilizes a single TM which provides information about the set of TMs in which the data payload will be transmitted, according to an example embodiment. Communications device 300 compromises a modem 304 including a processor (e.g., a digital signal processor, (DSP)) 304*a* communicably coupled to an associated memory 305 that stores a disclosed frame compiling algorithm for compiling a data frame for the PHY including tone mask identification information identifying a set of tones used for a data payload portion of the data frame. Communications device 300 can be used at a service node (which includes switch nodes and terminal nodes) or a base (data concentrator) node in the PLC communications network.

Memory 305 comprises non-transitory machine readable storage, for example, static random-access memory (SRAM). The processor 304*a* is programmed to implement the frame compiling algorithm. Modem 304 includes a timer 307, such as for ACK transmission, Carrier Sense Multiple Access/collision avoidance (CSMA)/CA) back-off and Data transmission purposes.

Transceiver (TX/RX) 306 is communicably coupled the modem which allows coupling of the communications device 300 to the shared powerline 340. The modem 304 is shown formed on an integrated circuit (IC) 320 comprising a substrate 325 having a semiconductor surface 326, such as a silicon surface. Memory 305 may be included on the IC 320. In one embodiment the modem 304 is implemented using 2 processor chips, such as 2 DSP chips. Besides the DSP noted above, the processor 304*a* can comprise a desktop computer, laptop computer, cellular phone, smart phone, or an application specific integrated circuit (ASIC).

Disclosed modems 304 and disclosed communications devices 300 can be used in a PLC network to provide a networked device that in service is connected to a powerline via a power cord. In general, the "networked device" can be any equipment that is capable of transmitting and/or receiving information over a powerline. Examples of different types of networked devices include, but are not limited or restricted to a computer, a router, an access point (AP), a wireless meter, a networked appliance, an adapter, or any device supporting connectivity to a wired or wireless network.

Figure 4:
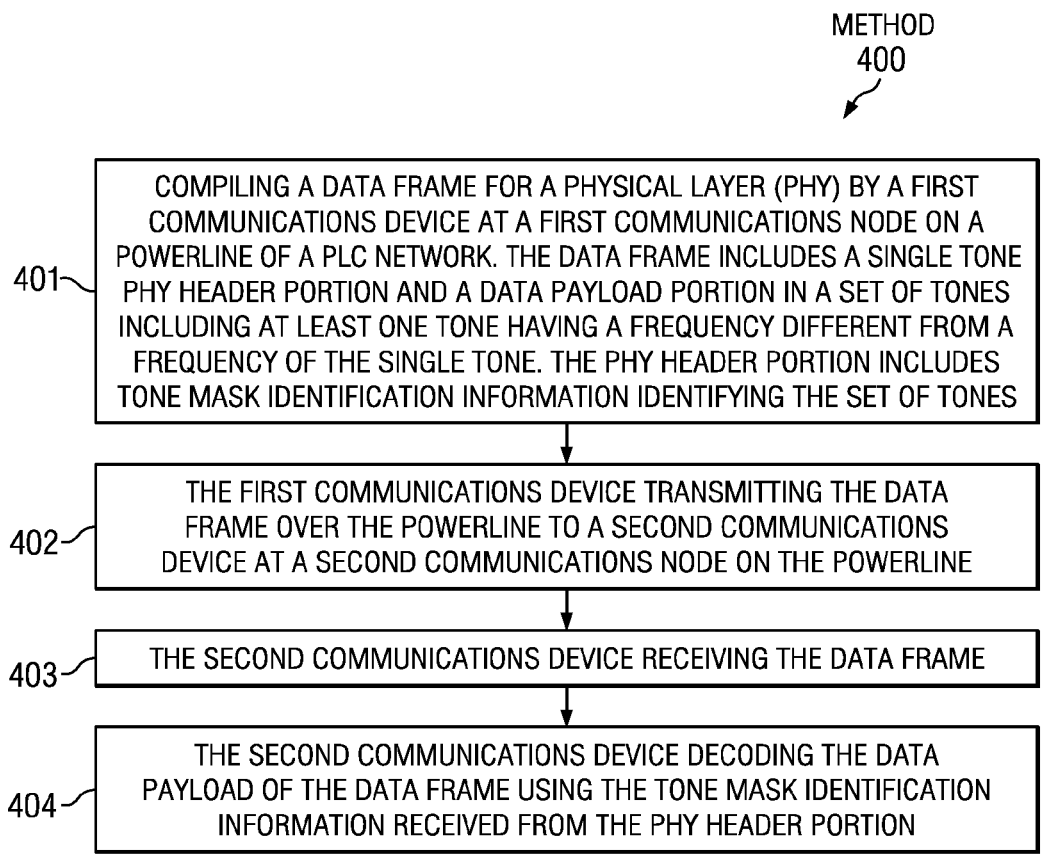
FIG. 4 is a flowchart for an example method for PLC communications in a PLC network that includes using data frames including a PHY header portion which utilizes a single TM which provides information about the set of TMs in which the data payload of the data frame will be transmitted, suitable for PLC communications, according to an example embodiment.

FIG. 4 is a flowchart for an example method 400 for PLC communications in a PLC network that includes using a data frame for PHY having a PHY header portion that utilizes a single TM which provides information about the set of TMs in which the data payload portion of the data frame will be transmitted, according to an example embodiment. Step 401 comprises compiling the data frame by a first communications device at a first communications node on a powerline of a PLC network. The PHY data frame includes a single tone PHY header portion and a data payload portion in a set of tones including at least one tone having a frequency different from a frequency of the single tone. The PHY header portion includes tone mask identification information identifying the set of tones in the data payload of the frame.

The selection of which particular tone mask(s) are used for the PHY header portion 220, data payload portion 240, and preamble portion 210 of the data frame is not part of disclosed embodiments. However, tone mask selection can be handled as known in the art, for example, by using the tone mask selection described in the IEEE P1901.2 standard. Step 402 comprises the first communications device transmitting the data frame over the powerline to a second communications device at a second communications node on the powerline. Step 403 comprises the second communications device receiving the data frame. In step 404, the second communications device decodes the data payload using the tone mask identification information received from the PHY header portion, such as based on one of the embodiments described above regarding FIG. 2A, 2B, or 2C.

Disclosed embodiments can be applied to PLC standards that support multi-tone mask modes, such as IEEE P1901.2 standard compliant PLC networks. Disclosed embodiments will also become applicable to standards such as G3 and PRIME if such standards choose to adopt multi-tone mask modes.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

We claim:

1. A method of powerline communications (PLC), comprising:
   compiling a data frame for a physical layer (PHY) by a first communications device at a first communications node on a powerline of a PLC network, said data frame including a single tone PHY header portion and a data payload portion in a set of tones including at least one tone having a frequency different from a frequency of said single tone;
   wherein said PHY header portion includes tone mask identification information identifying said set of tones, said tone mask identification is provided in a tone mask field within said PHY header portion which represents a data tone mask as a bit map;
   said first communications device transmitting said data frame over said powerline to a second communications device at a second communications node on said powerline,
   said second communications device receiving said data frame, and
   said second communications device decoding said data payload portion using said tone mask identification information.

2. The method of claim 1, wherein said tone mask field represents said data tone mask as a bit map only when a data tone mask (DTM) field of said data frame is set to indicate said DTM.

3. The method of claim 1, wherein said set of tones for said data payload are both at different frequencies when compared to said frequency of said single tone.

4. A method of powerline communications (PLC), comprising:
   compiling a data frame for a physical layer (PHY) by a first communications device at a first communications node on a powerline of a PLC network, said data frame including a single tone PHY header portion and a data payload portion in a set of tones including at least one tone having a frequency different from a frequency of said single tone;
   wherein said PHY header portion includes tone mask identification information identifying said set of tones, wherein said tone mask identification information is provided as an additional field added to a data frame of a PLC standard that supports multi-tone mask mode operation;
   said first communications device transmitting said data frame over said powerline to a second communications device at a second communications node on said powerline,
   said second communications device receiving said data frame, and
   said second communications device decoding said data payload portion using said tone mask identification information.

5. The method of claim 4, wherein said additional field is in a format comprising a first tone mask, first extension bit, a second tone mask, second extension bit, wherein said additional field ends as soon as one of said extension bits is set to 0.

6. The method of claim 4, wherein said set of tones for said data payload are both at different frequencies when compared to said frequency of said single tone.

7. The method of claim 4, wherein said tone mask field represents said data tone mask as a bit map only when a data tone mask (DTM) field of said data frame is set to indicate said DTM.

8. A modem for communications at a first node on a powerline communications (PLC) channel in a PLC network including a second node, comprising:
   a processor;
   wherein said processor is communicably coupled to a memory which stores a frame compiling algorithm for compiling a data frame including tone mask identification information identifying a set of tones used for a data payload portion of said data frame, wherein said processor is programmed to implement said frame compiling algorithm, said frame compiling algorithm:
   compiling said data frame including a single tone frame PHY header portion and said data payload portion in a set of tones including at least one tone having a frequency different from a frequency of said single tone, wherein said PHY header portion includes said tone mask identification information identifying said set of tones, wherein said tone mask identification is provided in a tone mask field within said PHY header portion which represents a data tone mask as a bit map,
   wherein said modem is configured for coupling to a PLC transceiver to provide said data frame to said PLC transceiver so that said PLC transceiver transmits said data frame over said PLC channel to said second node.

9. The modem of claim 8, wherein said modem is formed on an integrated circuit (IC) comprising a substrate having a semiconductor surface, and wherein said processor comprises a digital signal processor (DSP).

10. The modem of claim 8, wherein said tone mask field represents said data tone mask as a bit map only when a data tone mask (DTM) field of said data frame is set to indicate said DTM.

11. The modem of claim 8, wherein said set of tones for said data payload are both at different frequencies when compared to said frequency of said single tone.

12. A modem for communications at a first node on a powerline communications (PLC) channel in a PLC network including a second node, comprising:
   a processor;
   wherein said processor is communicably coupled to a memory which stores a frame compiling algorithm for compiling a data frame including tone mask identification information identifying a set of tones used for a data payload portion of said data frame, wherein said processor is programmed to implement said frame compiling algorithm, said frame compiling algorithm:
   compiling said data frame including a single tone frame PHY header portion and said data payload portion in a set of tones including at least one tone having a frequency different from a frequency of said single tone, wherein said PHY header portion includes said tone mask identification information identifying said set of tones, wherein said tone mask identification information is provided as an additional field added to a data frame of a PLC standard that supports multi-tone mask mode operation, wherein said modem is configured for coupling to a PLC transceiver to provide said data frame to said PLC transceiver so that said PLC transceiver transmits said data frame over said PLC channel to said second node.

13. The modem of claim 12, wherein said additional field is in a format comprising a first tone mask, first extension bit, a second tone mask, second extension bit, wherein said additional field ends as soon as one of said extension bits is set to 0.

14. The modem of claim 12, wherein said modem is formed on an integrated circuit (IC) comprising a substrate having a semiconductor surface, and wherein said processor comprises a digital signal processor (DSP).

15. The modem of claim 12, wherein said set of tones for said data payload are both at different frequencies when compared to said frequency of said single tone.

16. The modem of claim 12, wherein said tone mask field represents said data tone mask as a bit map only when a data tone mask (DTM) field of said data frame is set to indicate said DTM.

17. A communications device, comprising:
a memory which stores a frame compiling algorithm,
a modem, said modem comprising:
  a processor communicably coupled to said memory, wherein said processor is programmed to implement said frame compiling algorithm, said frame compiling algorithm:
    compiling a data frame including a single tone frame PHY header portion and a data payload portion in a set of tones including at least one tone having a frequency different from a frequency of said single tone, wherein said PHY header portion includes tone mask identification information identifying said set of tones used for said data payload portion, wherein said tone mask identification is provided in a tone mask field within said PHY header portion which represents a data tone mask as a bit map; and
a powerline communications (PLC) transceiver communicably coupled to said modem for transmitting said data frame over a PLC channel to a receiving node.

18. The communications device of claim 17, wherein said modem is formed on an integrated circuit (IC) comprising a substrate having a semiconductor surface, and wherein said processor comprises a digital signal processor (DSP).

19. The communications device of claim 17, wherein said tone mask field represents said data tone mask as a bit map only when a data tone mask (DTM) field of said data frame is set to indicate said DTM.

20. A communications device, comprising:
a memory which stores a frame compiling algorithm,
a modem, said modem comprising:
  a processor communicably coupled to said memory, wherein said processor is programmed to implement said frame compiling algorithm, said frame compiling algorithm:
    compiling a data frame including a single tone frame PHY header portion and a data payload portion in a set of tones including at least one tone having a frequency different from a frequency of said single tone, wherein said PHY header portion includes tone mask identification information identifying said set of tones used for said data payload portion, wherein said tone mask identification information is provided as an additional field added to a data frame of a PLC standard that supports multi-tone mask mode operation; and
a powerline communications (PLC) transceiver communicably coupled to said modem for transmitting said data frame over a PLC channel to a receiving node.

21. The communications device of claim 20, wherein said modem is formed on an integrated circuit (IC) comprising a substrate having a semiconductor surface, and wherein said processor comprises a digital signal processor (DSP).

22. The communications device of claim 20, wherein said tone mask field represents said data tone mask as a bit map only when a data tone mask (DTM) field of said data frame is set to indicate said DTM.

* * * * *